United States Patent [19]

Arnesen

[11] Patent Number: 4,832,816
[45] Date of Patent: May 23, 1989

[54] ELECTROSTATIC SYSTEM FOR TREATING LIQUIDS

[76] Inventor: Tore C. Arnesen, 158 Rexway Drive, Georgetown, Ontario, Canada, L7G 1S1

[21] Appl. No.: 906,245

[22] Filed: Sep. 12, 1986

[51] Int. Cl.$^4$ .................. C25B 11/00; C25D 17/00
[52] U.S. Cl. .................................................. 204/302
[58] Field of Search .......................... 204/302–306, 204/280, 286, 288, 290 R; 210/243, 748

[56] References Cited

U.S. PATENT DOCUMENTS

| | | |
|---|---|---|
| 3,585,122 | 6/1971 | King . |
| 4,024,047 | 5/1977 | Clark . |
| 4,073,712 | 2/1978 | Means . |
| 4,151,090 | 4/1979 | Fava ................................. 210/222 |
| 4,199,429 | 4/1980 | McMahon . |
| 4,545,887 | 10/1985 | Arnesen . |

FOREIGN PATENT DOCUMENTS

WO80/00226 2/1980 PCT Int'l Appl. .

OTHER PUBLICATIONS

H. P. Richter, Practical Electrical Wiring, Ninth Edition, McGraw-Hill Book Co., New York, 1972, pp. 128–142.

Primary Examiner—John F. Niebling
Assistant Examiner—William T. Leader
Attorney, Agent, or Firm—Donald E. Hewson

[57] ABSTRACT

An electrostatic system for treating liquid within a container includes a two wire, electrostatic field generator of improved construction having an enclosed two wire electrical supply and grounding provision, a concealed grounding connection, and an improved electrode construction to facilitate assembly and dissassembly thereof. The subject improved field generator may be used in an aerated circulation system to effectively moderate the rate of propagation of certain undesired bacterial cultures.

7 Claims, 3 Drawing Sheets

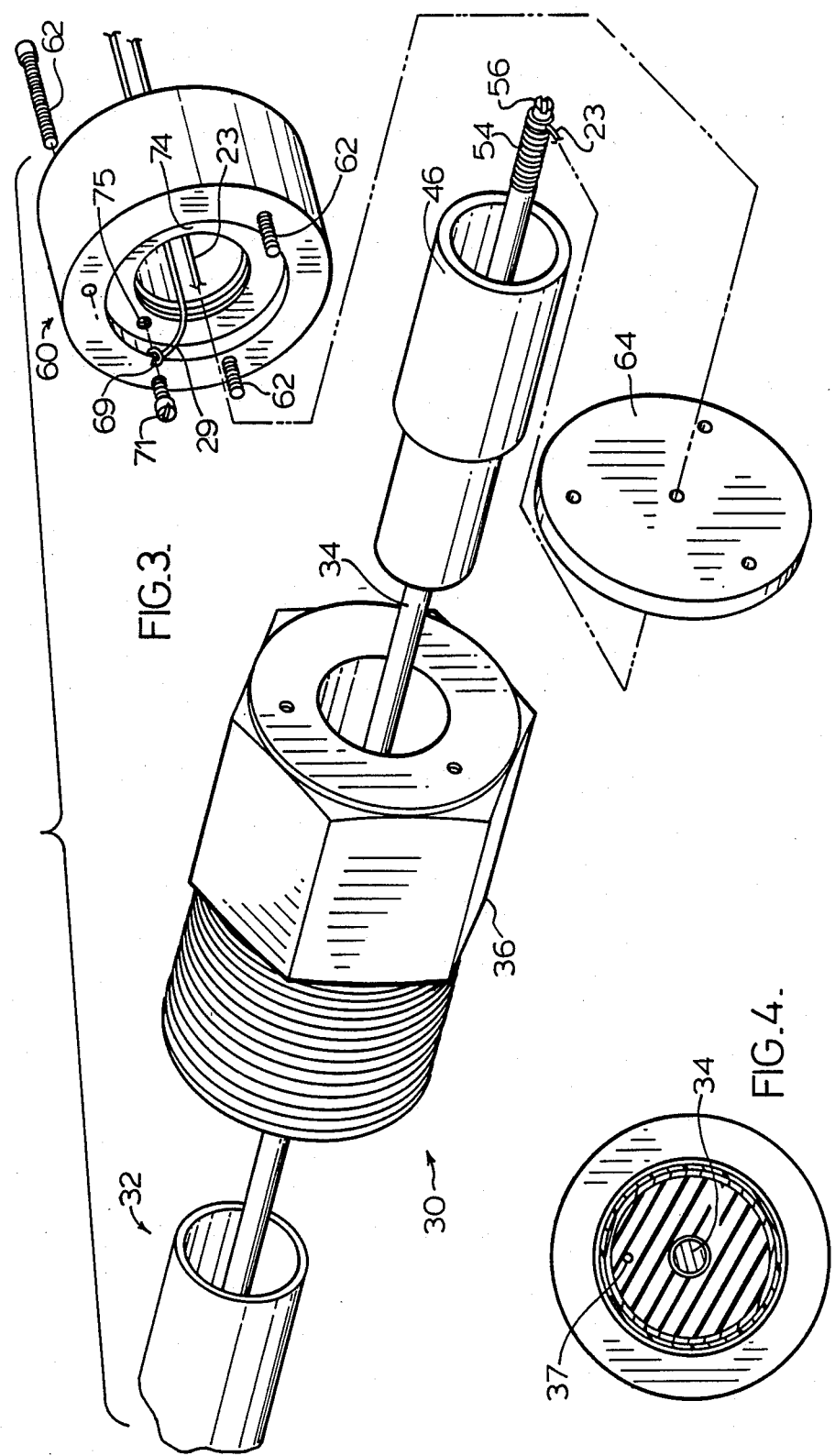

ELECTROSTATIC SYSTEM FOR TREATING LIQUIDS

BACKGROUND OF THE INVENTION

This invention is directed to an improved electrostatic system for treating liquids, and in particular, the provision of a protected, two wire system, including an improved electrostatic field generator.

In ARNESEN et al prior U.S. Pat. No. 4,545,887, there was provided an improved electrostatic field generator construction for use within a tank or other enclosure, for purposes of ameliorating the occurrence of scaling. The disclosed system also had the tendency to remove scale, if it had formed within the water system, including a tank and piping. The construction comprised a tube having protective end caps and a tension rod joining the opposing ends in mechanically secured relation. Earlier arrangements are to be found in the following U.S. Pat. Nos.: 3,585,122, KING, issued June 15, 1971; 4,024,047, CLARK, issued May 17, 1977; 4,073,712, MEANS, issued Feb. 14, 1978; 4,199,429, McMAHON, issued Apr. 22, 1980, and in PCT Publication No. W080/00226, RABBIT, issued Feb. 21, 1980.

While the use of an electrostatic field is well known in boiler and other industrial systems, for the prevention of scale formation and the actual reduction of deposited scale, surprising results have been reported in regards to the use of applicant's electrostatic field generator in the reduction of bacterial counts in certain water systems. Thus, it has been found that installation and operation of an electrostatic system incorporating the subject electrostatic field generator can drastically reduce the bacterial population within a given water system. It is further found that operation of the electrostatic system in a manner to effect bacterial control is not inimical to the anti-scaling function of the field generator.

BRIEF DESCRIPTION OF THE INVENTION

In accordance with the present invention, there is now provided an improved system, wherein the system wiring is improved, being less vulnerable to damage. Also the grounding of the electrostatic field generator utilizes a concealed grounding wire to minimize the likelihood of accidental or malicious interference, and the elimination of consequential electrical hazard. Furthermore, there is now provided a field generator construction of an enhanced type, capable of withstanding higher temperatures, and better suited for assembly and disassembly, utilizing modular parts for more rapid construction and reconstruction.

In addition there is now provided an enhanced method of operation, including the steps of inserting the subject electrostatic field generator within a receptacle, to generate a predetermined electrostatic field, circulating the liquid, generally water, through the so-generated electrostatic field, and oxygenating the circulating liquid, so as to moderate the growth of a predetermined bacterial population within the system.

In the case of the above noted prior ARNESEN et al construction, the system circuit utilized a single wire high tension (HT) supply, with the brass mounting boss of the field generator providing grounding contact with the metal wall of the vessel in which the field generator was mounted. An external electrical connection was provided to connect the wall of the vessel to ground. In the event of accidental disconnection, this constituted a potential hazard.

In the presently disclosed construction, a multi-wire circuit includes the HT generator supply and also connects the mounting boss of the field generator by way of a grounding wire to the HT power supply.

This is of particular importance in that the occurrence of changing local conditions, relative to the electrical grounding of the vessel in which the field generator is mounted, cannot now create an electrically hazardous condition. In the case of a return header pipe installation the grounding connection now no longer requires the provision of a grounding clamp on the pipe. Such clamps are very vulnerable to accidental, or unauthorized or malicious removal.

Furthermore, in the event of accidental damage to the insulation of the HT connection, the co-existence of a grounding wire with the HT lead, and within the same supply conduit, greatly increases the likelihood that any short circuit of the HT supply lead will result in transfer of the short circuit current directly back to the DC supply source through the grounding lead. This in turn diminishes the likelihood of the voltage potential of the tank or other installation being raised above ground value as a consequence of such a short circuit, while also enhancing the probability of the actuation of circuit protection devices, such as fuses or ground current protectors.

In addition to the foregoing improvements, the presently disclosed construction provides an electrostatic field generator of modular construction, having provision for making electrical HT and grounding connections thereto by way of a suitable conduit, mechanically connected to the field generator structure, and with concealed internal connections.

There are further provided certain embodiments incorporating improved construction of the distal end of the field generator, having a closure bushing secured to the end of the tubular portion, and a non-conductive insulating sleeve extending thereover, in protective and insulating relation.

In one such embodiment there is illustrated a sleeve of material such as polytetrafluoroethylene (PTFE), which is heat shrunk into place.

In a second such embodiment a PTFE or other similar end cap is welded to a PTFE sleeve, and a second sleeve shrunk thereover in sealing protective relation.

It will be understood that the closure bushing may be of conducting or of non-conducting material, for such embodiments.

In addition to the improved apparatus herein disclosed, there is now provided a method of operating the apparatus comprising the steps of energizing the field generator at a predetermined voltage so as to generate an electrostatic field, and circulating the liquid through the thus-generated electrostatic field. In addition, operation of the system so as increase oxygenation of the liquid, preferably through the medium of the system pump, further extends the beneficial effects of the system.

BRIEF DESCRIPTION OF THE DRAWINGS

Certain embodiments of the invention are described, reference being made to the drawings, wherein;

FIG. 3 is an exploded view of the components of the mounting boss of the subject field generator;

FIG. 4 is a cross sectional view taken at 4—4 of FIG. 2;

DETAILED DESCRIPTION OF THE PREFERRED EMBODIMENTS

Figure 1:
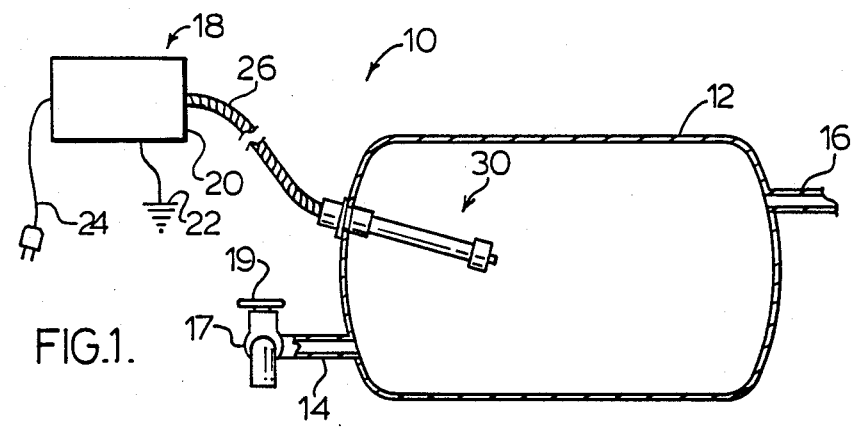
FIG. 1 is a schematic view of a typical liquid system which utilizes an electrostatic field generator according to the present invention.

Referring to FIG. 1, a typical system 10 is shown schematically, in installed relation to a tank 12. The tank 12 has connections 14 and 16 for the transfer of liquid therethrough. A pump 17 may be used to circulate the liquid to the tank 12, and may have a valve 19 to control induced air flow. In any event, the system 10 includes some form of vessel or tank 12, into which the field generator protrudes. It may also be used in a header such as may be associated with a boiler.

The system 10 further comprises a power supply 18, which includes a housing 20 provided with a grounding connection 22 and a supply connection 24 operating at normal domestic supply voltage of 110 or 220 volts as the case may be.

A reinforced metallic cable cover or rigid duct 26, illustrated as the former, connects the HT supply 18 to the field generator 30. The HT supply comprises an insulated HT lead 23 operating in the direct current voltage range of about 6000 volts, and a grounding connection 22.

In certain system installations, such as when the liquid in the system is water which may be used for irrigation purposes in commercial greenhouses and the like, opening of valve 19 permits a controlled flow of air in induced relation into the eye of the pump 19, so as to oxygenate the system.

Figure 2:
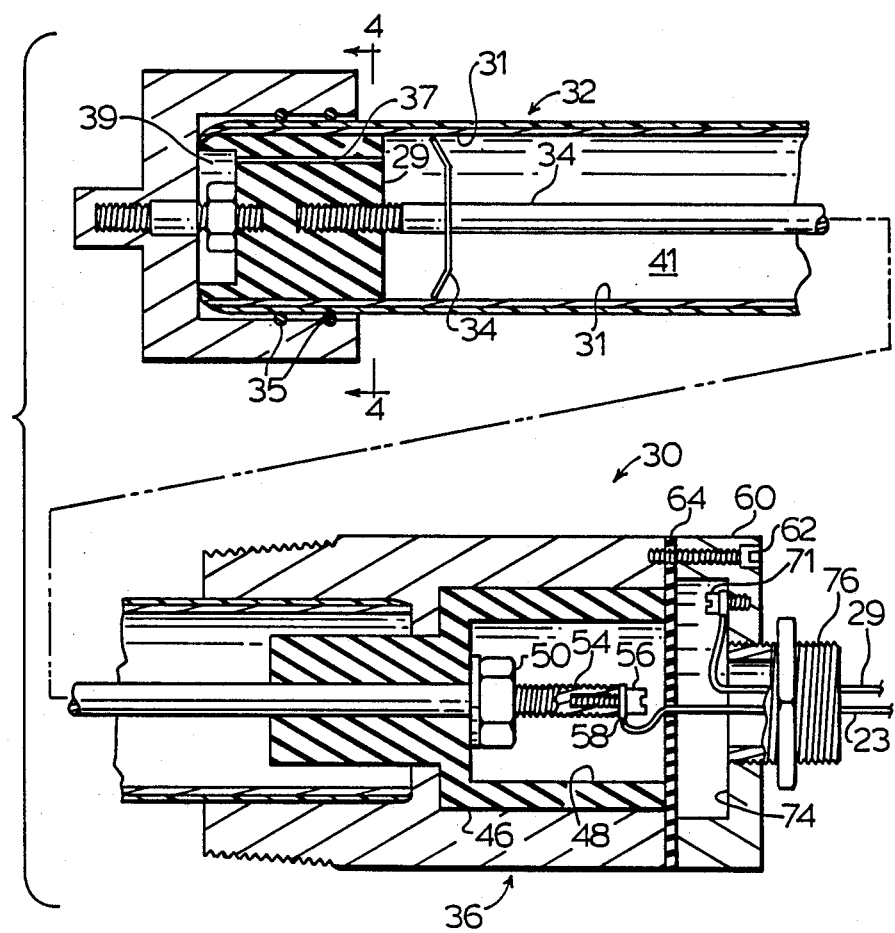
FIG. 2 is a side view, in diametrical section of the improved electrostatic field generator.

Referring to FIG. 2, the field generator 30 has an portion 32, an electrically conductive tie rod 34 and spring contact spider 34, and a threaded bushing 36 by which the field generator 30 is mounted. The remote (distal) end of electrode portion 32 comprises a nonconductive member 29, over which an electrically conductive member—usually an aluminum tube 31—extends. A bushing 33 is positioned in sealing relation over the distal end of the tube 31, and is sealed thereto by O-rings 35. An air vent passage 37 connects the enclosed space 39 within bushing 33 to the interior 41 of the portion 32. In addition to facilitating assembly and removal of the bushing 33 by permitting air flow from within the interior of the bushing 33 to the interior of the tube 31 as the bushing is advanced over the end of the tube, this vent 37 also reduces the loading on the O-rings 35, while also diminishing those variations in axial forces brought about by pressure changes due to variations in system ambient temperature.

Referring also to FIG. 3, the field generator 30 includes proximal end bushing 36, with an internal insulating bushing 46 having an axially extending recess 48 therein to receive a tensioning nut 50, and the proximal end 54 of rod 34. The proximal end 54 of rod 34 has a threaded hole therein by which screw 56 secures lug end 58 of HT lead 23. The bushing 46 requires to be substantially temperature insensitive, and to resist compressive loading thereon, and is preferably of PTFE, either a glass loaded or pure form such as TEFLON ®.

A cylindrical cover 60 is secured by cap screws 62 to the body portion 36, an elastomeric seal 64 being interposed therebetween. The lug end 69 of ground connection 29 is secured by screw 71 to a recessed face portion 74 of the cover 60, by way of a threaded hole 75.

An electrical conduit connector 76 is threadedly secured to the cover 60, whereby the duct or cover 26 is securely connected to cover 60, thereby effecting protection to grounding connection 29 and HT lead 23, within a common path.

As noted above, and referring to FIGS. 2 and 4, a vent passage 37 extends longitudinally through the stepped end plug 29. The reduced diameter portion of the plug 29 extends within the distal end of the metal pipe 31, over which a PTFE sleeve is shrunk in insulative and protective relation. The vent passage 37 serves to equalize the internal air pressure between the interior of pipe 31 and the interior of distal end member 33.

Figure 5:
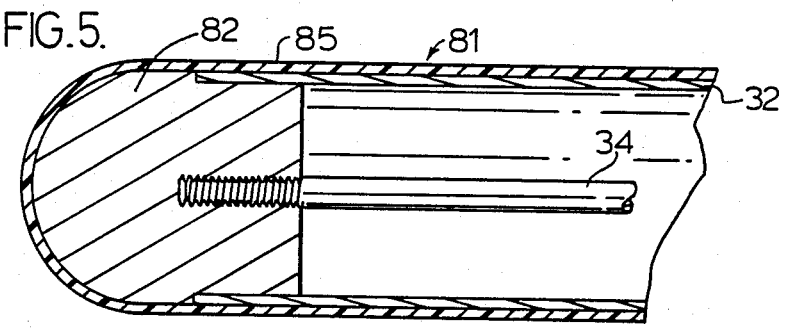
FIG. 5 is a side view in diametrical section of the distal end of another embodiment of the improved field generator.
Figure 6:
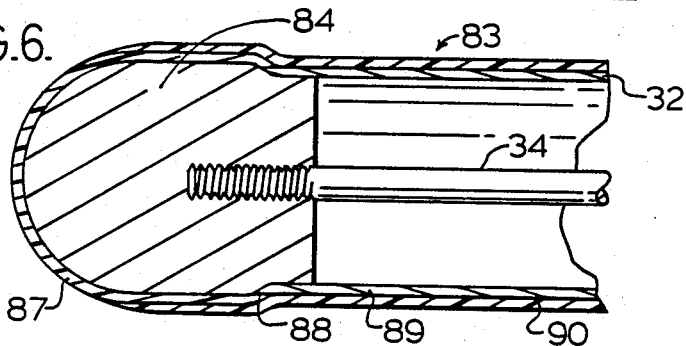
FIG. 6 is a like view of a still further embodiment.

Referring to FIGS. 5 and 6, there are illustrated two distal end constructions 81 and 83 respectively, having a tube portion 32, and an end bushing 82 or 84 in inserted relation therein, secured by tension rod 34.

A PTFE sleeve 85 is shrunk over the FIG. 5 embodiment.

In the case of the FIG. 6 embodiment, a PTFE end cap 87 is welded at 88 to a sleeve 89, and has a second PTFE sleeve 90 in partial overlying relation, and being heat shrunk in protective sealing engagement therewith. The end bushing 84, may be profiled in a suitable manner, such as that illustrated, in order to facilitate the welding of the end cap 87 to the sleeve 89. The extent of overlap of the PTFE sleeve 90 past the weld zone 88 affords additional protection to the weld zone 88.

The provision of a pair of PTFE sleeves in overlying shrunk-on relation provides additional protection from hazards such as pin hole perforations.

Figure 7:
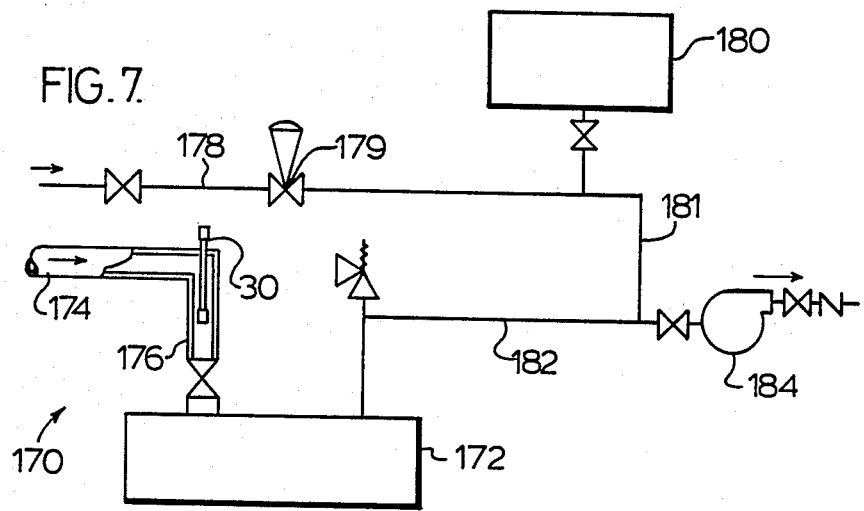
FIG. 7 shows a closed loop heating system incorporating the field generator.
Figure 8:
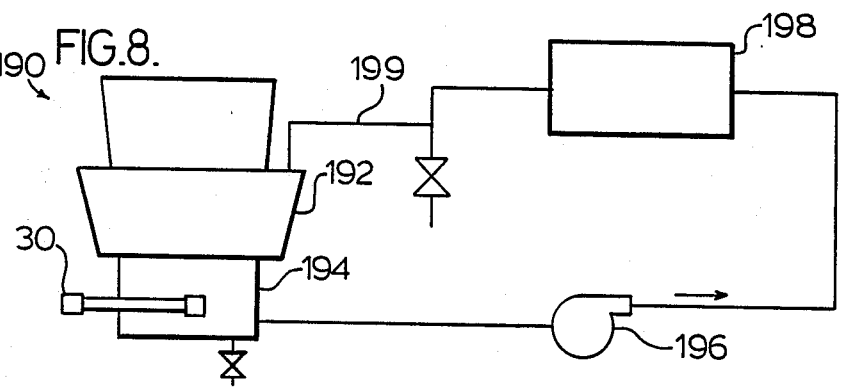
FIG. 8 shows a cooling tower and evaporative condenser system incorporating the field generator.

Referring to FIGS. 7 and 8, FIG. 7 shows a schematic arrangement of a portion of a closed loop heating system 170. The system 170 has a hot water boiler 172 to which a return line 174 connects, by way of header 176.

A field generator 30 in accordance with the present invention is mounted within header 176 in the fashion of a rod immersion heater.

A make-up water line 178, complete with a make-up water control valve 179, connected in parallel with expansion tank 180. The line 178 connects by line 181 with the outlet line 182 from the boiler 172, which is connected to the inlet of circulation pump 184 for delivering hot water to the system being served.

Turning to FIG. 8, which shows a closed loop chiller circuit 190 incorporating a cooling tower/evaporative condenser 192. The sump 194 of the arrangement has a field generator 30 inserted therein. The sump 194 connects by way of pump 196 with a chiller/compressor 198, which has a return line 199 back to the tower 192.

The installations of FIGS. 7 and 8 illustrate schematically certain of the types of installation on which the effects of electrostatic field generators were tried, on a test basis.

From observed tests carried out on a number of test installations, each incorporating a field generator, the following reports emerged:

(1) A field generator was used for a period of months in an installation incorporating a cooling tower in a circuit such as that shown in FIG. 8. All chemical water treatments were discontinued over the life of the tests. An inspection of the cooling tower and the tubes of the condenser and chiller, showed that they had become scale-free, and they also showed no sign of the presence of any algae.

(2) A four month comparative test was carried out on another system such as that illustrated in FIG. 8, comprising a 150 ton cooling tower in combination with a 200 ton chiller, the use of chemical water treatments was discontinued prior to the test. The test showed an absence of scale formation or biological fouling to the same extent as were observed in a number of corresponding control units which relied upon chemical treatment of the water. Moreover, at the end of the test period, it was noted that no anodic film was present in the tower and chiller circuit incorporating the field generator in its circuit.

(3) A two month test on a humidification system was carried out. Prior to the test, the 250 gallons per minute system had operated on week days and was shut down automatically on weekends. Chemical additive in the amount of one pint of liquid phosphate every two weeks had been totally unable to control a weekend bacteria count build up which was sufficiently extensive that each Monday the odor therefrom was "unbearable". The system was flushed down, chemical additives were discontinued and a field generator was installed.

The initial bacteriological count at commencement of the test was 8900 parts per milliliter (p.p.m.); after six days the count had climbed to 10,000 p.p.m.; and after a further thirteen days the count climbed to 40,000 p.p.m. However, after a further fourteen days, the count dropped to 3,400 p.p.m.; and a further fourteen days later the count reached a low of 1,200 p.p.m. Previously, with the system relying upon the phosphate treatments, the deposition of hard water scale on the humidifier would reduce air flow by 50% by season's end. After using the field generator for the season, the system was so clean that high airflows were maintained and no acid cleaning was required, as would normally have been the case.

The disclosed embodiment of a field generator for electrostatic treatment of a liquid is illustrated as being mounted within a tank (FIG. 1), a flow header (FIG. 7), and a sump (FIG. 8), with appropriate references being made thereto. However, it will be understood that the subject system is also applicable to a header or other liquid containing components of a system.

I claim:

1. An electrostatic field generator system adapted for use with a liquid-containing receptacle, said system comprising
   a. a source of direct current high voltage having a high voltage connection and a grounding connection;
   b. an electrode adapted for mounting through an opening in a wall of the receptacle and comprising an elongated conductive tubular member having a proximal end and a distal end,
   a sleeve fitted in insulative and protective relation over said tubular member,
   a distal bushing positioned in sealing relation at the distal end of said tubular member,
   a conductive proximal bushing having a hollow interior and two ends, the first end being positioned over and engaging said tubular member in the region adjacent the proximal end and the second end extending past the proximal end of the tubular member, said proximal bushing including means for mounting the electrode such that said proximal bushing is in electrical contact with the receptacle and said tubular member extends into the recepticle,
   a high voltage terminal located within the interior of said proximal bushing,
   means for connecting said high voltage terminal to the interior of said tubular member,
   insulating means within the interior of said proximal bushing to insulate said proximal bushing from said high voltage terminal,
   a conductive closure member having an inner surface disengagably engagable with and positioned to cover the second end of said proximal bushing,
   a grounding terminal located on the inner surface of said closure member,
   said closure member being engaged by means of a conductive engaging member extending between the closure member and the proximal bushing to provide electrical contact of the closure member and hence the grounding terminal with said proximal bushing; and
   c. an insulated high tension lead connecting said high voltage connection of the high voltage source to said high voltage terminal and a grounding lead connecting said grounding connection to said grounding terminal,
   whereby the grounded condition of said proximal bushing is substantially independent of the electrical potential acting on said receptacle.

2. The electrostatic field generator system of claim 1, wherein said insulating means comprises a modular preformed bushing located in close fitting relation within said proximal bushing.

3. The electrostatic field generator system of claim 1, wherein said high voltage lead and said grounding lead are located within a common mechanically protected passage which connects said voltage source to said electrode.

4. The electrostatic field generator system of claim 3, wherein said grounding lead is unsheathed.

5. The electrostatic field generator system of claim 1 wherein said distal bushing extends over the distal end of said tubular member, and wherein the electrode further comprises a nonconductive end plug located within the tubular member in the region extending inward from the distal end, said non-conductive member having a vent passage extending longitudinally therethrough.

6. The electrostatic field generator system of claim 1 wherein said distal bushing is partially fitted within the distal end of said tubular member, and a dielectric layer is provided in insulating relation over said distal bushing.

7. The electrostatic field generator system of claim 1 wherein said distal bushing is partially fitted within the distal end of said tubular member, an insulative end cap is provided over the distal bushing and a second sleeve is provided in partial overlying relation thereto.

* * * * *